(12) United States Patent
Ackermann et al.

(10) Patent No.: US 7,994,664 B2
(45) Date of Patent: Aug. 9, 2011

(54) SYSTEM AND METHOD FOR COOLING A SUPERCONDUCTING ROTARY MACHINE

(75) Inventors: Robert Adolf Ackermann, Schenectady, NY (US); Evangelos Trifon Laskaris, Schenectady, NY (US); Xianrui Huang, Clifton Park, NY (US); James William Bray, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 1407 days.

(21) Appl. No.: 11/009,146

(22) Filed: Dec. 10, 2004

(65) Prior Publication Data

US 2010/0001596 A1    Jan. 7, 2010

(51) Int. Cl.
*H02K 1/32* (2006.01)
(52) U.S. Cl. ............................. 310/52; 310/54; 310/61
(58) Field of Classification Search .................... 310/52, 310/54, 61, 64, 57–59
See application file for complete search history.

(56) References Cited

U.S. PATENT DOCUMENTS

| 3,801,843 | A | * | 4/1974 | Corman et al. ............... 310/52 |
| 4,365,479 | A | * | 12/1982 | Weghaupt et al. ............ 62/50.7 |
| 4,578,962 | A | * | 4/1986 | Dustmann ..................... 62/505 |
| 5,513,498 | A |   | 5/1996 | Ackermann et al. .......... 62/51.1 |
| 6,347,522 | B1 |  | 2/2002 | Maguire et al. ................... 62/6 |
| 6,412,289 | B1 |  | 7/2002 | Laskaris et al. .............. 62/50.7 |
| 6,415,613 | B1 |  | 7/2002 | Ackermann et al. ......... 62/51.1 |
| 6,438,969 | B1 |  | 8/2002 | Laskaris et al. .............. 62/51.1 |

FOREIGN PATENT DOCUMENTS

WO    WO-2004/102779 A1    11/2004

\* cited by examiner

*Primary Examiner* — Dang D Le
(74) *Attorney, Agent, or Firm* — Fletcher Yoder

(57) ABSTRACT

A system for cooling a superconducting rotary machine includes a plurality of sealed siphon tubes disposed in balanced locations around a rotor adjacent to a superconducting coil. Each of the sealed siphon tubes includes a tubular body and a heat transfer medium disposed in the tubular body that undergoes a phase change during operation of the machine to extract heat from the superconducting coil. A siphon heat exchanger is thermally coupled to the siphon tubes for extracting heat from the siphon tubes during operation of the machine.

10 Claims, 5 Drawing Sheets

SYSTEM AND METHOD FOR COOLING A SUPERCONDUCTING ROTARY MACHINE

STATEMENT REGARDING FEDERALLY SPONSORED RESEARCH & DEVELOPMENT

This invention was made with Government support under contract number DE-FC36-02-GO11100 awarded by Department of energy. The Government has certain rights in the invention.

BACKGROUND

The invention relates generally to a cooling system for a superconducting rotary machine, and in particular to a sealed thermal siphon cooling system and a method for cooling a superconducting rotor coil using such a system.

A superconductor is an element, inter-metallic alloy, or compound that will conduct electricity without resistance when cooled below a critical temperature. Superconductivity occurs in a wide variety of materials, including elements such as tin and aluminum, various metallic alloys, some heavily doped semiconductors, and certain ceramic compounds. In conventional superconductors, superconductivity is caused by a force of attraction between certain conduction electrons arising from the exchange of phonons, which causes the fluid of conduction electrons to exhibit a super fluid phase composed of correlated pairs of electrons.

Superconductors are useful in a variety of applications including magnetic resonance imaging systems and power generation and delivery systems, such as motors and generators. The loss of electrical resistance in the superconductor enables these devices to be operated with a much greater efficiency. High temperature superconducting coil field windings are formed of superconducting materials that can be brittle and must be cooled to a temperature at or below a critical temperature to achieve and maintain superconductivity.

Superconducting coils have been cooled by cryogenic fluids such as helium, neon, nitrogen, hydrogen and the like. However it is difficult to precisely control the amount of liquid cryogen surrounding the superconducting coil. If the amount of liquid cryogen surrounding the coil is too low or at an insufficiently low temperature, insufficient cooling of the coil occurs. If the amount of liquid cryogen surrounding the coil is too great or below a desired temperature range, and unevenly distributed around the coil, rotational imbalance may be generated in the machine. This can cause high radial vibration and potentially damage the machine, given the high rates of rotation and substantial radius in certain applications. Moreover, in existing cryogenic cooling systems for such machines, there is not sufficient storage of cryogen in the cooling system to allow service of the cooling unit without shut down of the electrical machine operation, resulting in loss of superconductivity and consequent complex shutdown and startup procedures.

Accordingly, there is a need for a technique that enables even distribution of liquid cryogen around a superconducting coil. In addition, a cooling system with reserve capacity that provides efficient cooling of a superconducting coil is also desirable.

BRIEF DESCRIPTION

In accordance with one aspect of the technique, a system for cooling is provided for a superconducting rotary machine. The system includes a plurality of sealed siphon tubes disposed in balanced locations around a rotor adjacent to a superconducting coil. Each of the sealed siphon tubes includes a tubular body and a heat transfer medium disposed in the tubular body that undergoes a phase change during operation of the machine to extract heat from the superconducting coil. A siphon heat exchanger is thermally coupled to the siphon tubes for extracting heat from the siphon tubes during operation of the machine.

In accordance with another aspect of the technique, a method for cooling a superconducting rotary machine is provided. The method includes disposing a plurality of sealed siphon tubes in balanced locations around a rotor superconducting coil and extracting heat from the superconducting coil via a heat transfer medium disposed in the sealed siphon tubes. Heat is extracted from the siphon tubes during operation of the machine via a siphon heat exchanger.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
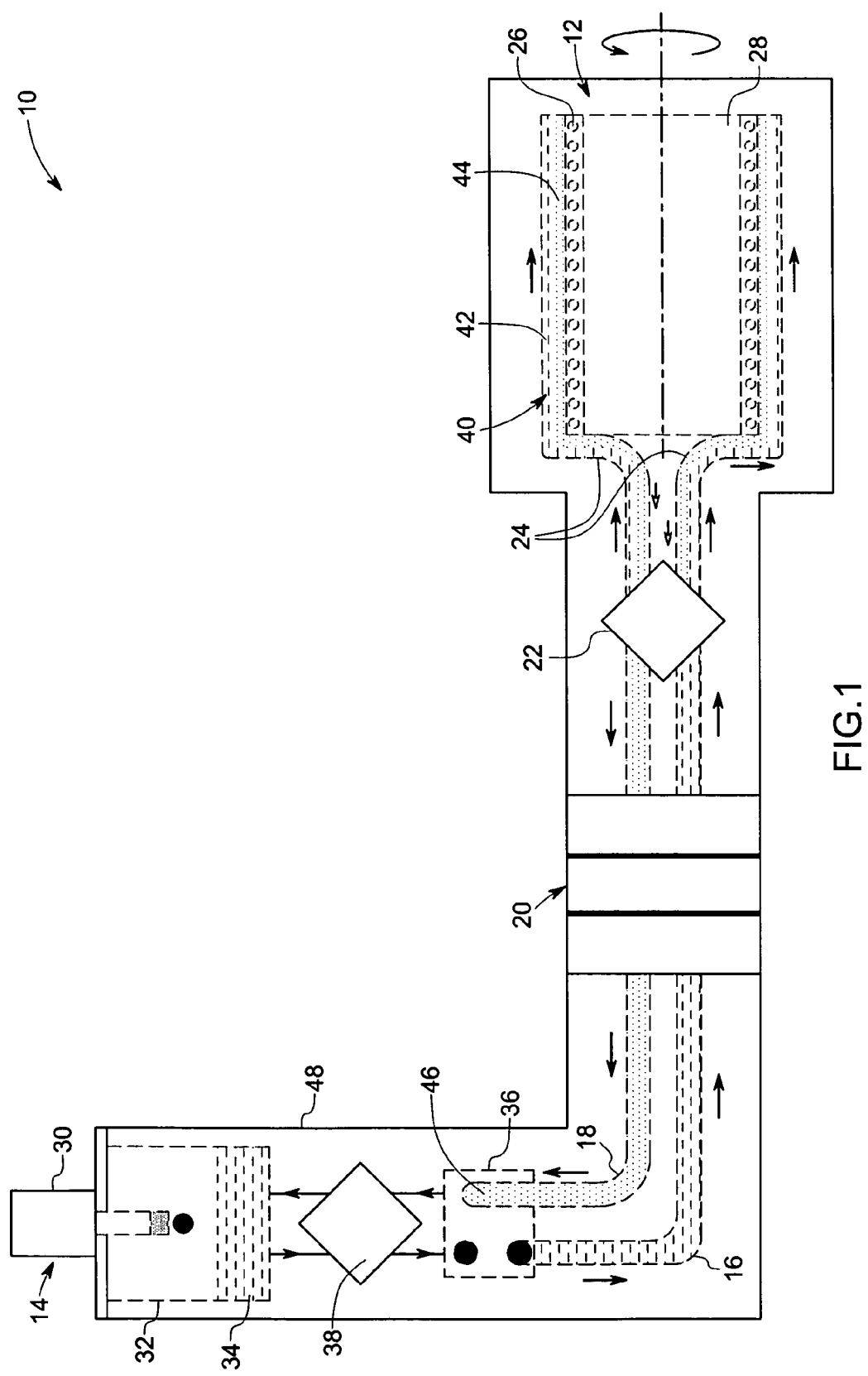
FIG. 1 is a diagrammatical view of a thermal siphon cooling system for a superconducting rotary machine in accordance with an exemplary embodiment of the present technique.

Referring to FIG. 1, a thermal siphon cooling system 10 is illustrated for a superconducting rotary electric machine 12, which is typically a motor or a generator. In addition, the techniques may be used in other systems that utilize superconductors, such as medical imaging systems. The thermal siphon cooling system 10 includes a cryogenic refrigeration system 14, a cryogen transfer-in tube 16, a cryogen transfer-out tube 18, a transfer coupling 20, a siphon heat exchanger 22, and a plurality of sealed siphon tubes 24. In the illustrated embodiment, the rotary electrical machine 12 is a generator. In this embodiment, the generator 12 has a superconductive rotor coil 26 that is disposed on a rotor core 28. The superconductive rotor coil 26 produces a magnetic field from electricity that it receives from a power source (not shown). If the temperature of the superconductive rotor coil 26 exceeds a critical current, the coil 26 may loose its superconductivity and a quench condition in the superconductive rotor coil 26 may result. The thermal siphon cooling system 10 is provided to cool the superconductive rotor coil 26 and avoid such excessive temperatures in the coil 26.

The cryogenic refrigeration system 14 includes a cryogenic refrigerator 30 mounted on a primary vessel 32 provided to hold a reservoir of cryogenic fluid 34 condensed by the cryogenic refrigerator 30. As appreciated by those skilled in the art, the cryogenic refrigerator 30 may include Gifford- McMahan type, pulse tube type, or any other suitable refrigeration system, and the cryogenic fluid may be nitrogen, neon, hydrogen, helium, or a combination of such fluids, or any other suitable fluid capable of withdrawing sufficient heat from the generator 12, and particularly from the coil 26. The liquid cryogen 34 stored in the primary vessel 32 provides a thermal buffer to absorb increased thermal loads during a fault condition of the generator 12 or during a power outage when no cooling is available from the cryogenic refrigerator 30. A secondary vessel 36 with its own independent supply of liquid cryogen 34 is coupled to the primary vessel 32 via an intermediate heat exchanger 38.

The plurality of sealed siphon tubes 24 are disposed at balanced locations around the superconductive rotor coil 26. In the illustrated embodiment, two sealed siphon tubes 24 are disposed at diametrically opposed locations around the superconductive rotor coil 26. Although in the illustrated embodiment, two sealed siphon tubes 24 are shown, any number of siphon tubes may be envisaged. In another embodiment, the siphon tubes 24 comprises heat pipes. A heat transfer medium 40 is disposed in the siphon tubes 24 and configured to undergo phase change during the operation of the generator 12 to extract heat from the superconductive coil 26. In the illustrated embodiment, the heat transfer medium 40 includes a two-phase cryogenic fluid (i.e. liquid phase 42, and a vapor phase 44). The siphon tubes 24 are hermetically sealed at both of their ends. The siphon heat exchanger 22 is thermally coupled to the siphon tubes 24 for extracting heat from the siphon tubes 24 during operation of the generator 12. The operation of the siphon heat exchanger 22 is explained in detail below.

The cryogen transfer tube-in tube 16 and cryogen transfer-out tube 18 are coupled to the secondary vessel 36. The cryogen transfer-in tube 16 and the cryogen transfer-out tube 18 are coupled via the transfer coupling 20 to the siphon heat exchanger 22. The cryogen transfer-in tube 16 is configured to supply liquid cryogen 34 from the secondary vessel 36 to the siphon heat exchanger 22. As a result, the siphon heat exchanger 22 is cooled by the cryogenic fluid 34. The cryogen transfer-out tube 18 is configured to form a path for the flow of cryogen vapor 46 from the siphon heat exchanger 22 to the secondary vessel 36. In one example, the cryogen transfer-in tube 16 may be placed inside the cryogen transfer-out tube 18 to minimize parasitic heat gains.

The cryogen vapor 46 in the secondary vessel 36 is recondensed by transfer of heat to the reservoir of cryogenic fluid 34 in the primary vessel 32. The intermediate heat exchanger 38 provides a thermal interface between the cryogen vapor 46 in the secondary vessel 36 and the cryogenic fluid 34 in the primary vessel 32. The liquid cryogen in the primary vessel 32 cools and condenses the cryogen vapor 46 in the secondary vessel 36. This condensation of cryogen vapor 46 in the secondary vessel 36 facilitates gravity feeding of cryogen fluid into the cryogen transfer-in tube 16 and out tube 18 and also maintaining a constant temperature of fluid in the cryogen transfer-in tube 16 and out tube 18.

In another embodiment, cryogenic fluid may be a single-phase fluid such as helium gas and may be forced to flow through the tubes 16, 18 using an impeller. In such a case, flow rate and cryogenic properties of the cryogenic fluid are adequate to transfer the heat from the siphon heat exchanger 22 to the intermediate heat exchanger 38.

The cryogenic refrigeration system 14, the cryogen transfer-in tube 16, the cryogen transfer-out tube 18, the transfer coupling 20, the siphon heat exchanger 22, the plurality of sealed siphon tubes 24 and the generator 12 are disposed inside a vacuum enclosure 48. The vacuum enclosure 48 is configured to provide thermal insulation to the components enclosed inside the enclosure 48. The vacuum enclosure 48 may consist of several independent vacuums as required for ease of construction.

Figure 2:
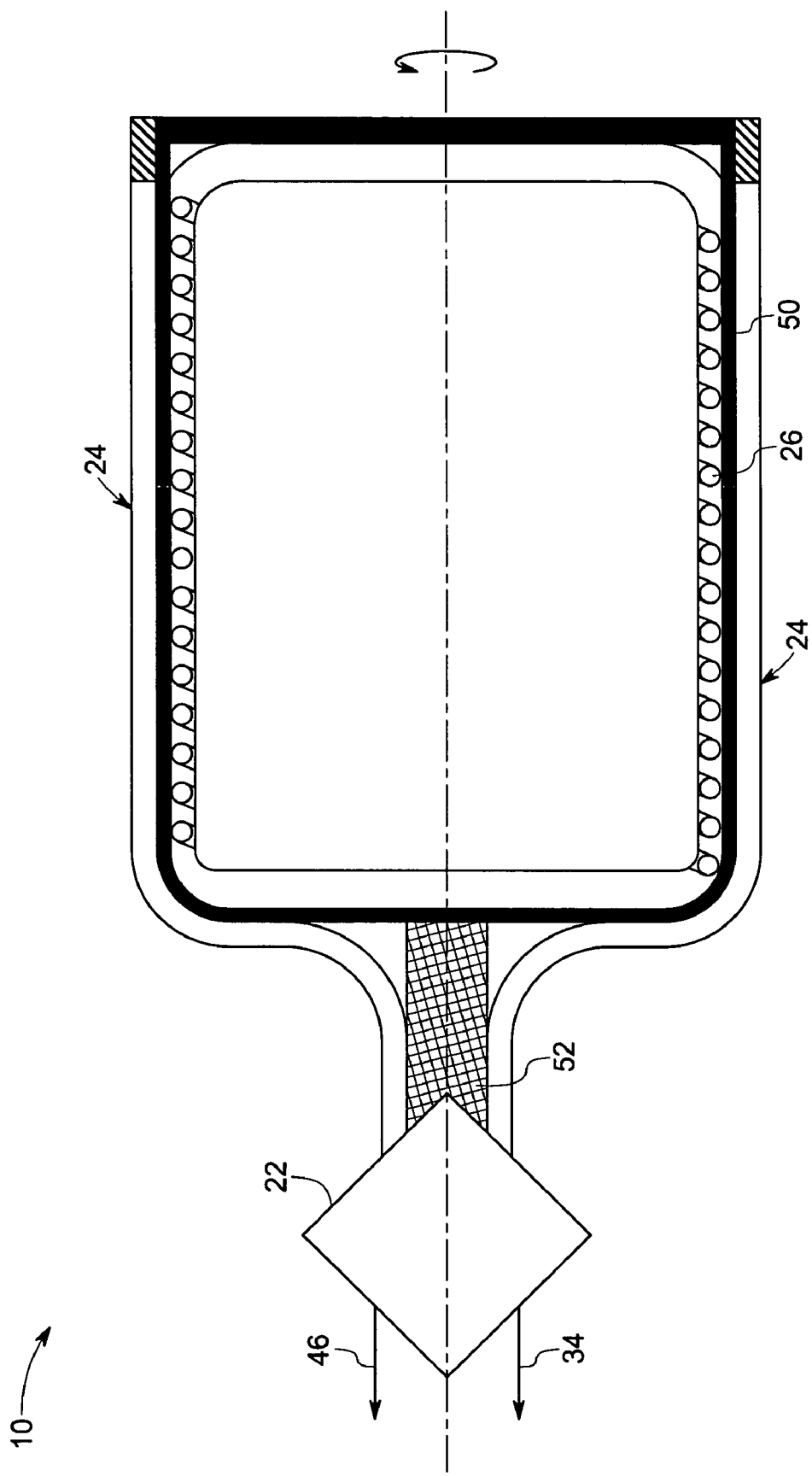
FIG. 2 is diagrammatical view of a thermal siphon cooling system for a superconducting coil in accordance with aspects of FIG. 1.

Referring to FIG. 2, a detailed view of thermal siphon cooling system 10 is illustrated. As illustrated above, two sealed thermal siphon tubes 24 are disposed at diametrically opposed locations around the superconductive rotor coil 26. The cryogenic fluid in the sealed thermal siphon tubes 24 undergoes evaporation and condensation to facilitate the cooling of the superconductive rotor coil 26.

A thermal conduction sheet 50 is provided between the superconductive rotor coil 26 and the sealed thermal siphon tubes 24. The thermal conduction sheet 50 comprises a high thermal conductivity material. In the illustrated embodiment, the thermal conduction sheet 50 includes a copper sheet. As appreciated by those skilled in the art, any other suitable thermal conduction sheets are also envisaged. The thermal conduction sheet 50 minimizes the thermal gradient between the rotor coil 26 and the sealed thermal siphon tubes 24. The thermal conduction sheet 50 also facilitates distribution of heat from the rotor coil 26 to the siphon tubes 24, and helps spread the heat evenly along the length of the rotor coil 26. A thermal bus 52 is provided between the thermal conduction sheet 50 and the siphon heat exchanger 22. The thermal bus 52 is configured to provide a thermal interface between the thermal conduction sheet 50 and the siphon heat exchanger 22.

Figure 3:
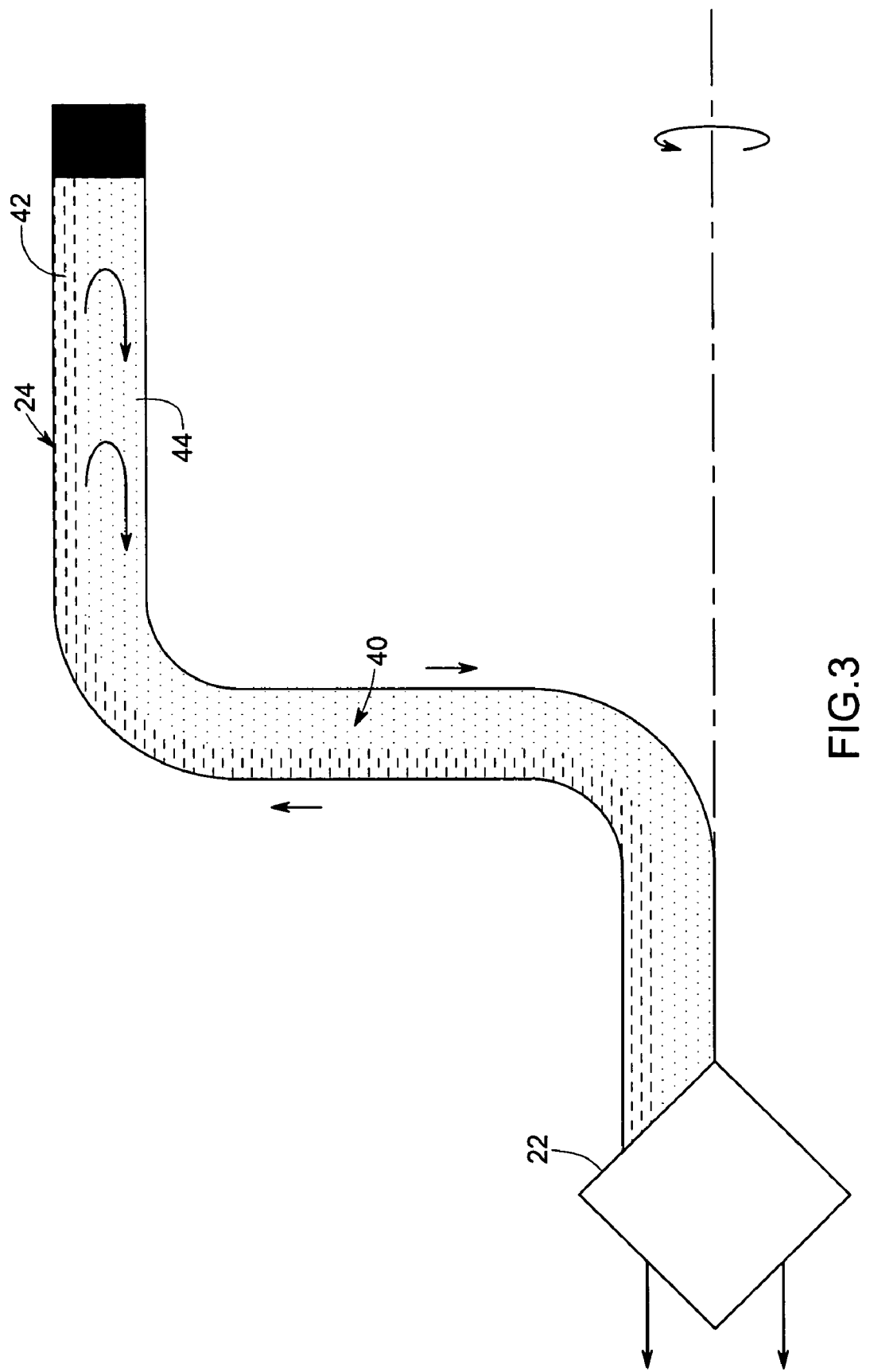
FIG. 3 is a diagrammatical view of a sealed siphon tube in accordance with aspects of FIG. 1.

Referring to FIG. 3, a sealed siphon tube 24 is illustrated. As illustrated, the two-phase cryogenic fluid 40 (i.e. liquid phase 42, and a vapor phase 44) is disposed inside the siphon tube 24. As discussed above, each siphon tube 24 is hermetically sealed at both of its ends. The end of the siphon tube 24 which is in contact with cryogen transfer-in tube 16 and out tube 18 is sealed with the siphon heat exchanger 22 configured to transfer heat from the siphon tube 24 to the cryogenic fluid 34 in the cryogen transfer-in tube 16. As a result, cryogenic vapor 44 in the siphon tube 24 is condensed. The rotation of rotor core 28 and the centrifugal force generated by such rotation causes flow of liquid cryogen 42 along the longitudinal and radial direction in the siphon tube 24. The heat generated from the coil 26 evaporates the liquid cryogen in the siphon tube 24, converting the fluid to the vapor phase that, due to its relatively low density, flows back towards the siphon heat exchanger 22. The axial temperature along the siphon tube 24 is maintained approximately constant and equal to the evaporation temperature of the liquid. This facilitates transfer of heat from the superconductive rotor coil 26 and also maintain a generally isothermal coil temperature.

In the above illustrated embodiment, the thermal siphon cooling system 10 is capable of providing cooling for three modes of operation of generator such as cool down of coil, standstill operation, and rotational operation. During cool down of the coil 26 of the generator 12, the cryogenic liquid in the primary vessel 32 is used to cool and condense the cryogenic vapor in the secondary vessel 36 and the cryogenic transfer-out tube 18. The cryogenic liquid in the cryogenic transfer-in tube 16 is in thermal contact with the thermal bus 52 coupled to the thermal conduction sheet 50 resulting in the conductive cooling of coil 26. During standstill mode of operation, evaporative cooling of coil 26 occurs in only the lower siphon tube. The upper section of the coil is cooled via the thermal conduction sheet 50. The thermal conduction sheet 50 transfers heat from the upper section of the coil to the lower siphon tube to cool the coil. During rotational operation mode, the rotational force generates a radial outward force on the cryogenic liquid in the siphon tube so that the cryogenic liquid is forced to the outer side of the siphon tube. The heat generated from the coil evaporates the cryogenic liquid in the siphon tube. The cryogenic vapor flows towards the siphon heat exchanger 22. The evaporation and condensation of cryogenic fluid in the siphon tube facilitates effective cooling of the coil.

The thermal siphon cooling system 10 described above provides a passive cooling of the superconductive coil 26. As a result, liquid cryogen is evenly distributed around the coil 26, thereby eliminating rotational imbalance in the machine. The need for an active control system to monitor and control the flow of liquid cryogen into the generator is eliminated.

Figure 4:
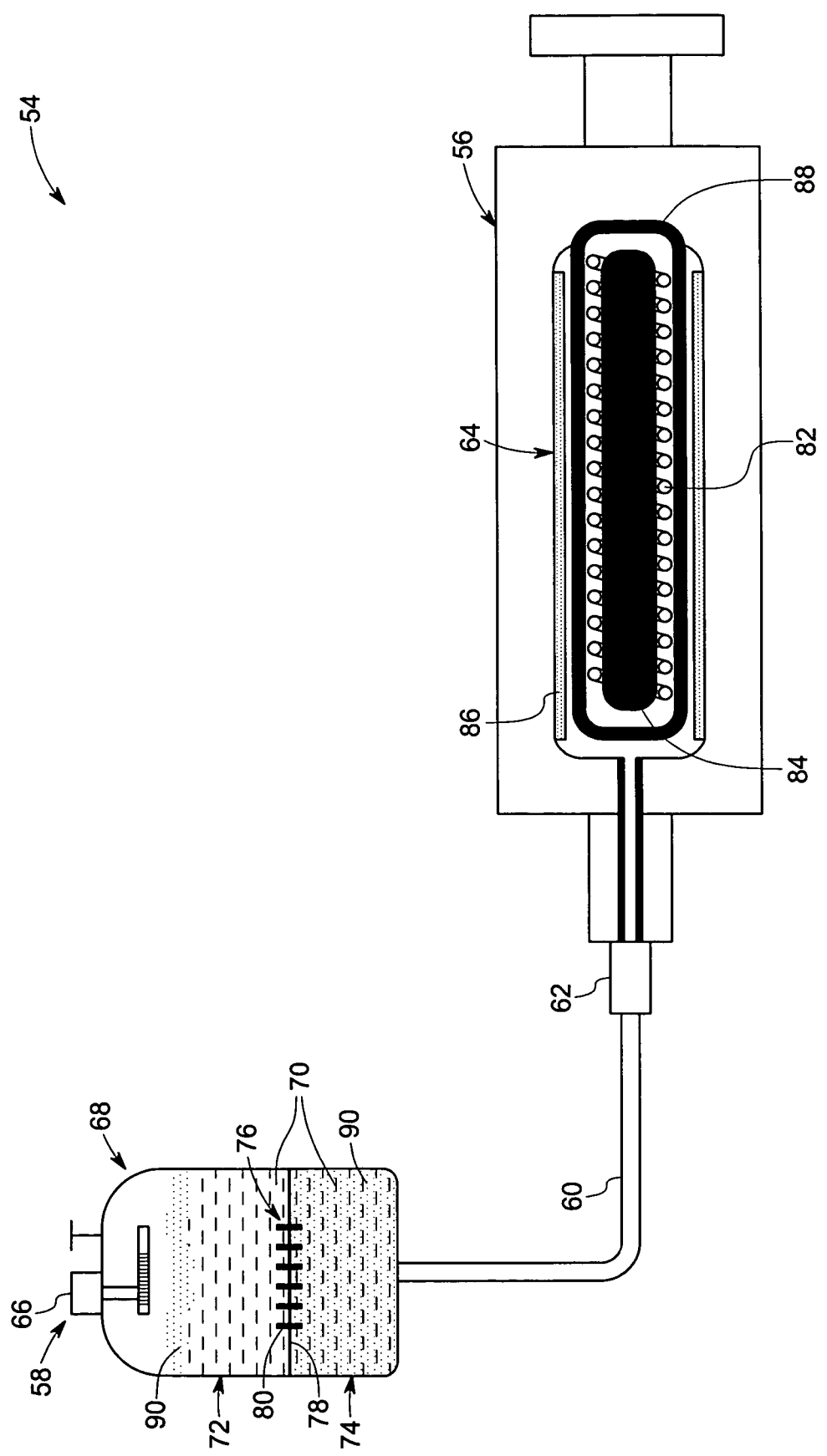
FIG. 4 is a diagrammatical view of a closed loop evaporative cooling system for a high temperature superconducting rotor in accordance with another exemplary embodiment of the present technique.

Referring to FIG. 4, closed loop evaporative cooling system 54 is illustrated for a high temperature superconducting rotor 56. The cooling system 54 includes a cryogenic refrigeration system 58, a cryogen transfer tube 60, a transfer coupling 62, and a plurality of direct cooling tubes 64. The cooling system 54 includes a cryocooler recondenser cold head 66 mounted on a two chamber dewar 68 provided to hold a reservoir of cryogenic fluid 70 condensed by the cold head 66. Although in the illustrated embodiment, a single cold head 66 is illustrated, multiple cold heads are also envisaged. The two chamber dewar 68 includes a first chamber 72, a second chamber 74, and a heat exchanger 76 provided between the first chamber 72 and the second chamber 74. In the illustrated embodiment, the heat exchanger 76 includes a copper plate 78 provided with a plurality of fins 80.

The superconducting rotor 56 includes a superconducting rotor coil 82 disposed around a rotor core 84. The plurality of direct cooling tubes 64 are disposed at balanced locations around the superconductive rotor coil 82. In the illustrated embodiment, two direct cooling tubes 64 are disposed at diametrically opposed locations around the superconductive rotor coil 82. A heat transfer medium 86 is disposed in the direct cooling tubes 64 and configured to undergo phase change during the operation of the generator to extract heat from the superconductive coil 82. In the illustrated embodiment, the heat transfer medium 86 includes a two-phase cryogenic fluid. A copper foil 88 is provided between the direct cooling tubes 64 and the superconductive coil 82 and configured to minimize thermal gradient between the rotor coil 82 and the direct cooling tubes 64 to facilitate cooling of the rotor coil 82.

The cryogen transfer tube 60 is coupled to the second dewar chamber 74. The cryogen transfer tube 60 is coupled via the transfer coupling 62 to the direct cooling tubes 64. The cryogen transfer tube 60 is configured to supply liquid cryogen 70 from the second dewar chamber 74 to the direct cooling tubes 64. The cryogen transfer tube 60 is also configured to form a path for the flow of cryogen vapor 90 from the direct cooling tubes 64 to the second dewar chamber 74.

The cryogen vapor 90 in the second dewar chamber 74 is recondensed by transfer of heat to the reservoir of cryogenic fluid 70 in the first dewar chamber 72. The heat exchanger 76 provides a thermal interface between the cryogen vapor 90 in the second dewar chamber 74 and the cryogenic fluid 70 in the first dewar chamber 72. The liquid cryogen 70 in the first dewar chamber 72 cools and condenses the cryogen vapor 90 in the second dewar chamber 74. In the illustrated embodiment, pressure in the second dewar chamber 74 is greater than the pressure in the first dewar chamber 72.

The first dewar chamber 72 provides a large storage of liquid cryogen that is maintained by cold heads 66. This allows service of cold heads without requirement of machine shutdown.

Figure 5:
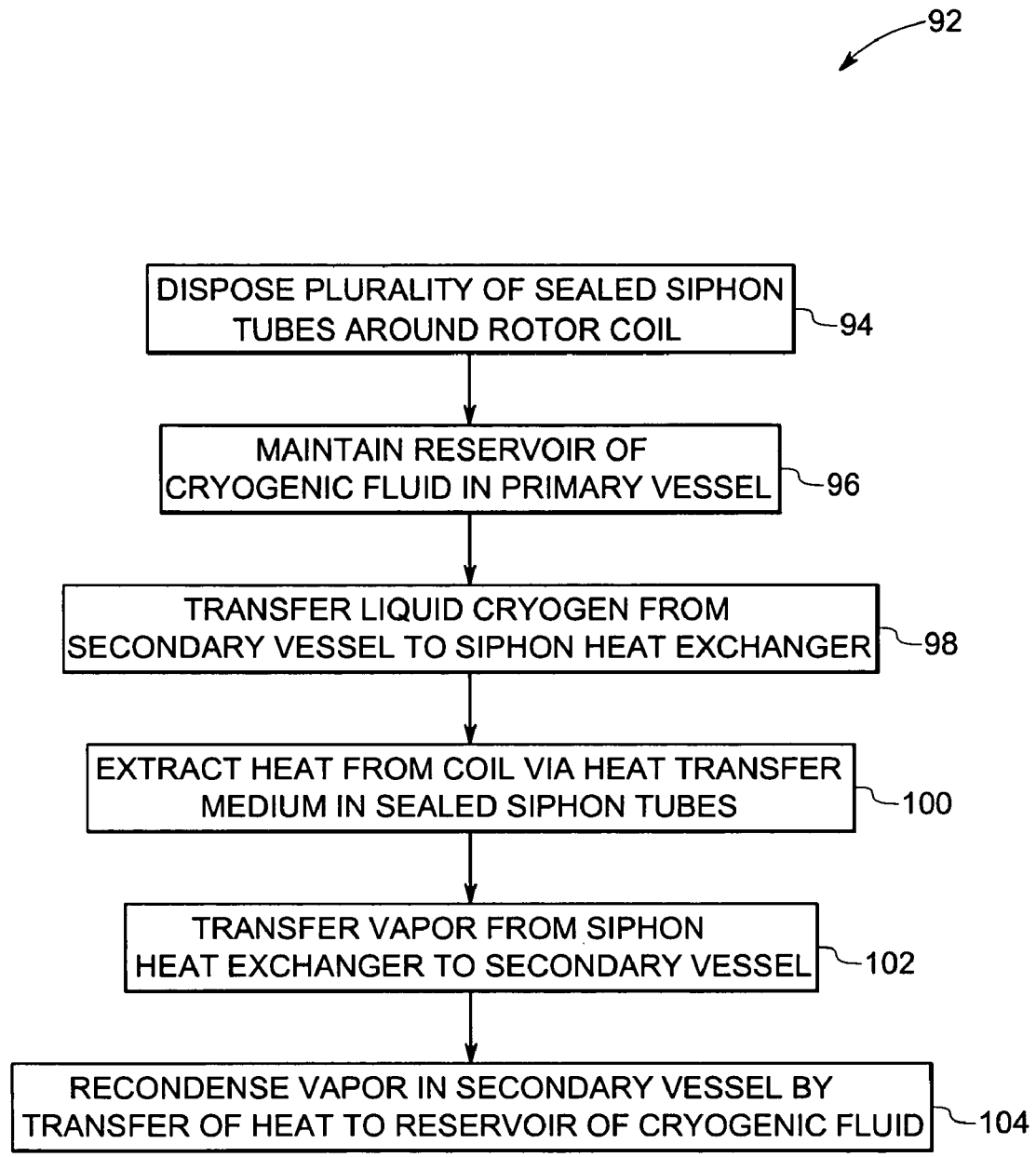
FIG. 5 is a flow chart illustrating exemplary steps involved in the cooling for the superconducting rotary machine.

FIG. 5 is a flow chart illustrating exemplary steps involved in cooling of superconductive rotary machine. The general cooling process is designated by the reference numeral 92. At step 94, plurality of sealed siphon tubes are disposed at balanced locations around superconductive rotor coil provided around the rotor core. Typically, two sealed siphon tubes are disposed at diametrically opposed locations around the coil. At step 96, a reservoir of cryogenic fluid is maintained in a primary vessel via a cryogenic refrigerator of the cryogenic refrigeration system. This reserve capacity of cryogenic fluid enables to maintain cooling during thermal transient conditions or power outages, or when the cooling system is stopped, so that superconductivity of the rotor coil 26 is maintained.

At step 98, liquid cryogen stored in the secondary vessel of cryogenic refrigeration system is transferred via a transfer tube to the siphon heat exchanger coupled to the sealed siphon tubes. During operation of the machine, current flows through the superconductive coil and magnetic field is generated. The coil is subjected to heating by its environment and operation. This heat is extracted via a heat transfer medium disposed in the siphon tubes as indicated by reference numeral 100. As illustrated, the heat transfer medium is a cryogenic liquid. The cryogenic liquid undergoes a phase change during extraction of heat from the coil. The siphon heat exchanger acts as a thermal interface between the vapor in the sealed siphon tube and the cryogenic liquid in the transfer tube. The vapor is condensed in the sealed siphon tube by transferring heat to the cryogenic liquid in the transfer tube. At step 102, the generated cryogenic vapor is transferred from the siphon heat exchanger to the secondary vessel via the cryogenic transfer tube. At step 104, the liquid cryogen cools and condenses the cryogenic vapor in the secondary vessel. An intermediate heat exchanger acts as a thermal interface between the liquid cryogen in the primary vessel and cryogenic vapor in the secondary vessel. This enables gravity feeding of cryogenic liquid from the secondary vessel to the siphon heat exchanger via the cryogenic transfer tube.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for cooling a superconducting rotary machine comprising:
   a plurality of sealed siphon tubes sealed from one another and disposed in balanced locations around a rotor adjacent to a superconducting coil, each of the sealed siphon tubes including a tubular body and a heat transfer medium disposed in the tubular body that undergoes a phase change during operation of the machine to extract heat from the superconducting coil; and
   a siphon heat exchanger thermally coupled to the siphon tubes for extracting heat from the siphon tubes during operation of the machine.

2. The system of claim 1, comprising two sealed siphon tubes disposed at diametrically opposed locations around the superconducting rotor coil.

3. The system of claim 1, wherein the heat transfer medium includes a two-phase cryogenic fluid.

4. The system of claim 1, wherein the siphon heat exchanger is cooled by a cryogenic fluid.

5. The system of claim 1, further comprising a cryogenic refrigeration system for maintaining a cryogenic fluid in a liquid state, wherein the cryogenic refrigeration system includes a primary vessel configured to hold a reservoir of cryogenic liquid, and a secondary vessel for cooling the siphon heat exchanger, vapor in the secondary vessel being recondensed by transfer of heat to the reservoir of cryogenic fluid.

6. The system of claim 5, wherein the cryogenic refrigeration system further comprises an intermediate heat exchanger configured to provide a thermal interface between vapor in the secondary vessel and cryogenic liquid in the primary vessel.

7. The system of claim 6, further comprising a cryogen transfer-in tube configured to supply liquid cryogen from the secondary vessel to the siphon heat exchanger.

8. The system of claim 7, further comprising a cryogen transfer-out tube configured to form a path for the flow of vapor from the siphon heat exchanger to the secondary vessel.

9. The system of claim 1, further comprising a thermal conduction sheet arranged parallel to the siphon tubes.

10. A superconducting rotary machine comprising:
a rotor including a superconducting coil configured to generate a magnetic field;
a plurality of sealed siphon tubes sealed from one another and disposed in balanced locations around the rotor adjacent to the superconducting coil, each of the sealed siphon tubes including a tubular body and a heat transfer medium disposed in the tubular body that undergoes a phase change during operation of the machine to extract heat from the superconducting coil; and
a siphon heat exchanger thermally coupled to the siphon tubes for extracting heat from the siphon tubes during operation of the machine.

* * * * *